United States Patent
Stroh

(10) Patent No.: US 12,333,599 B1
(45) Date of Patent: Jun. 17, 2025

(54) FINANCIAL HEALTH SCORING FOR DIRECT CLIENT-MERCHANT TRANSACTIONS

(71) Applicant: FREEDOM FINANCIAL NETWORK, LLC, San Mateo, CA (US)

(72) Inventor: Bradford Stroh, San Mateo, CA (US)

(73) Assignee: Freedom Financial Network LLC, San Mateo, CA (US)

( * ) Notice: Subject to any disclaimer, the term of this patent is extended or adjusted under 35 U.S.C. 154(b) by 331 days.

(21) Appl. No.: 17/736,842

(22) Filed: May 4, 2022

Related U.S. Application Data

(60) Provisional application No. 63/184,068, filed on May 4, 2021, provisional application No. 63/184,057, filed on May 4, 2021.

(51) Int. Cl.
*G06Q 40/03* (2023.01)
*G06Q 40/06* (2012.01)

(52) U.S. Cl.
CPC .............. *G06Q 40/03* (2023.01); *G06Q 40/06* (2013.01)

(58) Field of Classification Search
None
See application file for complete search history.

(56) References Cited

U.S. PATENT DOCUMENTS

| | | |
|---|---|---|
| 6,456,983 B1 | 9/2002 | Keyes |
| 7,165,044 B1 | 1/2007 | Chaffee |
| 7,860,781 B1 | 12/2010 | Bodi |
| 8,204,809 B1 | 6/2012 | Wise |
| 8,412,622 B2 | 4/2013 | Ariff |
| 8,694,430 B2 | 4/2014 | Kobayashi |
| 8,719,132 B1 | 5/2014 | Diggdon |
| 9,552,610 B1 | 1/2017 | Tewell |

(Continued)

FOREIGN PATENT DOCUMENTS

| | | |
|---|---|---|
| WO | WO-2001/059671 A2 | 8/2001 |
| WO | WO-0157756 A1 | 8/2001 |

(Continued)

OTHER PUBLICATIONS

Authors: B. Landfeldt et al: User Service Assistant: an end-to-end reactive QoS architecture; Date of Conference: May 18-20, 1998 Date Added to IEEE Xplore: Aug. 6, 2002 (Year: 2002).

(Continued)

*Primary Examiner* — Fateh M Obaid
(74) *Attorney, Agent, or Firm* — Mahamedi IP Law LLP

(57) ABSTRACT

A computing system can initially receive client data of a client of the financial health service. Using the client data, the system generates an individualized action plan and a financial health score for the client. The system further receives, in real-time, financial update data indicating changes to a financial situation of the client. In response to receiving the financial update data, the system updates the individualized action plan and the financial health score for the client. Thereafter, the system may receive a financial health request from a transaction entity with which the client transacts, and based at least in part on the financial health request, the system can transmit the updated financial health score to the computing device of the transaction entity.

17 Claims, 6 Drawing Sheets

(56) References Cited

U.S. PATENT DOCUMENTS

| | | | |
|---|---|---|---|
| 10,019,760 B2 | 7/2018 | Dintenfass | |
| 10,069,972 B1 | 9/2018 | Molander | |
| 10,163,156 B1 | 12/2018 | Shapley | |
| 10,169,784 B1 | 1/2019 | Hildebrand | |
| 10,242,402 B1 | 3/2019 | Soccorsy | |
| 10,262,372 B2 | 4/2019 | Dintenfass | |
| 10,460,379 B1 | 10/2019 | Diggdon | |
| 10,672,076 B2 | 6/2020 | Pillai | |
| 10,825,028 B1 | 11/2020 | Kramme | |
| 10,891,037 B1 | 1/2021 | Mackrell | |
| 11,087,412 B1 | 8/2021 | Ho et al. | |
| 11,176,461 B1 | 11/2021 | Merritt | |
| 11,227,335 B2 | 1/2022 | Hayden | |
| 11,249,985 B2 | 2/2022 | Wu et al. | |
| 11,270,375 B1 * | 3/2022 | Jennings | G06N 20/00 |
| 11,509,771 B1 | 11/2022 | Ross | |
| 11,551,293 B1 | 1/2023 | Soccorsy | |
| 11,615,077 B1 * | 3/2023 | Sroka | G06N 5/045 |
| | | | 707/703 |
| 11,790,268 B1 | 10/2023 | Wick et al. | |
| 11,853,982 B1 | 12/2023 | Woodward et al. | |
| 12,002,087 B1 | 5/2024 | McCormick | |
| 2002/0046049 A1 | 4/2002 | Siegel | |
| 2002/0138409 A1 | 9/2002 | Bass | |
| 2003/0105688 A1 | 6/2003 | Brown | |
| 2003/0229560 A1 | 12/2003 | Bourassa et al. | |
| 2004/0019560 A1 | 1/2004 | Evans | |
| 2004/0243508 A1 | 12/2004 | Samson | |
| 2005/0075914 A1 | 4/2005 | Bayne | |
| 2005/0256735 A1 | 11/2005 | Bayne | |
| 2006/0010057 A1 | 1/2006 | Bradway et al. | |
| 2006/0080197 A1 | 4/2006 | Chi | |
| 2006/0293983 A1 | 12/2006 | Rosenblatt | |
| 2008/0147521 A1 | 6/2008 | Weaver | |
| 2009/0006226 A1 | 1/2009 | Crowder | |
| 2009/0048957 A1 * | 2/2009 | Celano | G06Q 40/06 |
| | | | 705/35 |
| 2009/0125375 A1 | 5/2009 | Bateni | |
| 2009/0276368 A1 | 11/2009 | Martin | |
| 2010/0111287 A1 | 5/2010 | Xie | |
| 2010/0217706 A1 | 8/2010 | Griffin | |
| 2011/0161155 A1 | 6/2011 | Wilhelm | |
| 2011/0178922 A1 | 7/2011 | Imrey | |
| 2011/0251978 A1 | 10/2011 | Davies | |
| 2012/0066106 A1 | 3/2012 | Papadimitriou | |
| 2012/0246048 A1 | 9/2012 | Cohen | |
| 2013/0006824 A1 | 1/2013 | Maisonneuve | |
| 2013/0054435 A1 | 2/2013 | Zhang | |
| 2013/0085936 A1 | 4/2013 | Law | |
| 2013/0179338 A1 | 7/2013 | Evans | |
| 2013/0290165 A1 | 10/2013 | Cerise | |
| 2014/0310151 A1 * | 10/2014 | Shishkov | G06Q 40/03 |
| | | | 705/38 |
| 2014/0316810 A1 * | 10/2014 | Oliver | G06Q 10/10 |
| | | | 705/3 |
| 2014/0365350 A1 * | 12/2014 | Shvarts | G06Q 40/00 |
| | | | 705/35 |
| 2014/0365353 A1 * | 12/2014 | Shvarts | G06Q 40/03 |
| | | | 705/38 |
| 2015/0039388 A1 | 2/2015 | Rajaraman | |
| 2015/0046214 A1 | 2/2015 | Jain | |
| 2015/0221044 A1 | 8/2015 | Ariff | |
| 2015/0356574 A1 | 12/2015 | Ballew | |
| 2015/0379488 A1 | 12/2015 | Ruff | |
| 2016/0110813 A1 | 4/2016 | Hayden | |
| 2016/0232546 A1 | 8/2016 | Ranft | |
| 2016/0275608 A1 | 9/2016 | Dintenfass | |
| 2016/0275609 A1 | 9/2016 | Dintenfass | |
| 2016/0275610 A1 | 9/2016 | Dintenfass | |
| 2016/0275614 A1 | 9/2016 | Dintenfass | |
| 2016/0275615 A1 | 9/2016 | Dintenfass | |
| 2016/0307272 A1 | 10/2016 | Thalker | |
| 2017/0013131 A1 | 1/2017 | Craib | |
| 2017/0262821 A1 | 9/2017 | Imrey | |
| 2018/0012300 A1 | 1/2018 | Imrey | |
| 2018/0082372 A1 | 3/2018 | Diana | |
| 2018/0096319 A1 * | 4/2018 | Aggarwal | G06Q 20/403 |
| 2018/0096386 A1 * | 4/2018 | Aggarwal | G06Q 30/0255 |
| 2018/0181903 A1 | 6/2018 | Kojima et al. | |
| 2018/0293657 A1 | 10/2018 | Dintenfass | |
| 2019/0034951 A1 | 1/2019 | Cole | |
| 2019/0130016 A1 | 5/2019 | Jennings | |
| 2019/0139118 A1 | 5/2019 | Hyde | |
| 2019/0236461 A1 | 8/2019 | Wong | |
| 2019/0351766 A1 | 11/2019 | Spivak | |
| 2019/0378207 A1 | 12/2019 | Dibner-Dunlap | |
| 2020/0074539 A1 | 3/2020 | Palaghita | |
| 2020/0074540 A1 | 3/2020 | Wolfe | |
| 2020/0104763 A1 | 4/2020 | Carney | |
| 2020/0104843 A1 | 4/2020 | Bhasin | |
| 2020/0104935 A1 | 4/2020 | Schmitt | |
| 2020/0111159 A1 | 4/2020 | Sambhar | |
| 2020/0151697 A1 | 5/2020 | Pinto | |
| 2020/0257680 A1 | 8/2020 | Danyi | |
| 2020/0334685 A1 * | 10/2020 | Yan | G06Q 20/4016 |
| 2020/0351403 A1 | 11/2020 | George | |
| 2020/0380547 A1 | 12/2020 | Vltavsky | |
| 2020/0394159 A1 | 12/2020 | Hurley et al. | |
| 2020/0402625 A1 | 12/2020 | Aravamudan | |
| 2020/0410583 A1 | 12/2020 | Hart | |
| 2021/0073909 A1 * | 3/2021 | Le Roux | G06N 5/01 |
| 2021/0081271 A1 | 3/2021 | Doshi | |
| 2021/0124576 A1 | 4/2021 | Gungabeesoon | |
| 2021/0133670 A1 * | 5/2021 | Cella | G06N 3/044 |
| 2021/0142384 A1 | 5/2021 | Nori | |
| 2021/0201359 A1 | 7/2021 | Sekar | |
| 2021/0201394 A1 * | 7/2021 | Lemanski | G06Q 40/02 |
| 2021/0256084 A1 | 8/2021 | Marsh | |
| 2022/0036302 A1 * | 2/2022 | Cella | G06N 20/00 |
| 2022/0076834 A1 | 3/2022 | Hanlon | |
| 2022/0101383 A1 * | 3/2022 | Bloom | G06Q 50/01 |
| 2022/0138280 A1 | 5/2022 | Riggs | |
| 2022/0245574 A1 * | 8/2022 | Cella | G06Q 10/087 |
| 2022/0255969 A1 | 8/2022 | Cage | |
| 2022/0345543 A1 | 10/2022 | Oleinikov | |
| 2022/0406463 A1 | 12/2022 | Hanlon | |
| 2023/0070467 A1 | 3/2023 | Lim | |
| 2023/0075411 A1 | 3/2023 | Jeph | |
| 2023/0125183 A1 | 4/2023 | Olesen | |
| 2023/0127675 A1 | 4/2023 | Olesen | |
| 2023/0128256 A1 | 4/2023 | Olesen | |
| 2023/0130840 A1 * | 4/2023 | Olesen | G06Q 40/03 |
| | | | 705/38 |
| 2023/0162191 A1 | 5/2023 | Valencia | |
| 2023/0325840 A1 | 10/2023 | Visegrady et al. | |
| 2023/0342761 A1 | 10/2023 | Zhang et al. | |
| 2024/0112157 A1 | 4/2024 | Sun et al. | |
| 2025/0046457 A1 | 2/2025 | Hanlon | |

FOREIGN PATENT DOCUMENTS

| | | |
|---|---|---|
| WO | WO-2003/048996 A1 | 6/2003 |
| WO | WO-2005/096204 | 10/2005 |
| WO | WO-2018/033934 | 2/2018 |

OTHER PUBLICATIONS

Authors: Xin Bai et al: Coordination in Intelligent Grid Environments; Published in: Proceedings of the IEEE ( vol. 93, Issue: Mar. 3, 2005) pp. 613-630; Date of Publication: Feb. 28, 2005 (Year: 2005).

"How to Read your Escrow Statement", found online at https://www.spservicing.com/Content/pdf/HowToReadStatement_BKEscrowStatement.pdf (Year: 2017).

12 CFR 1024.17 (Year: 2017).

* cited by examiner

FINANCIAL HEALTH SCORING FOR DIRECT CLIENT-MERCHANT TRANSACTIONS

RELATED APPLICATIONS

This application claims benefit of priority to Provisional U.S. Patent Application No. 63/184,057, filed May 4, 2021; and to Provisional U.S. Patent Application No. 63/184,068, filed May 4, 2021; both of the aforementioned priority applications being hereby incorporated by reference in their respective entireties.

BACKGROUND

When clients engage with merchants for large transactions, the merchant typically requires a credit check, which is executed by one or more credit bureaus. These credit bureaus collect financial information of individual consumers and create credit scores that indicate consumer creditworthiness—the risk-reward potential of financing a purchase made by the consumer. These credit scores comprise a three-digit number, typically between 300 and 850, which impact the size of a loan the consumer qualifies for and/or the interest rates available to that consumer.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
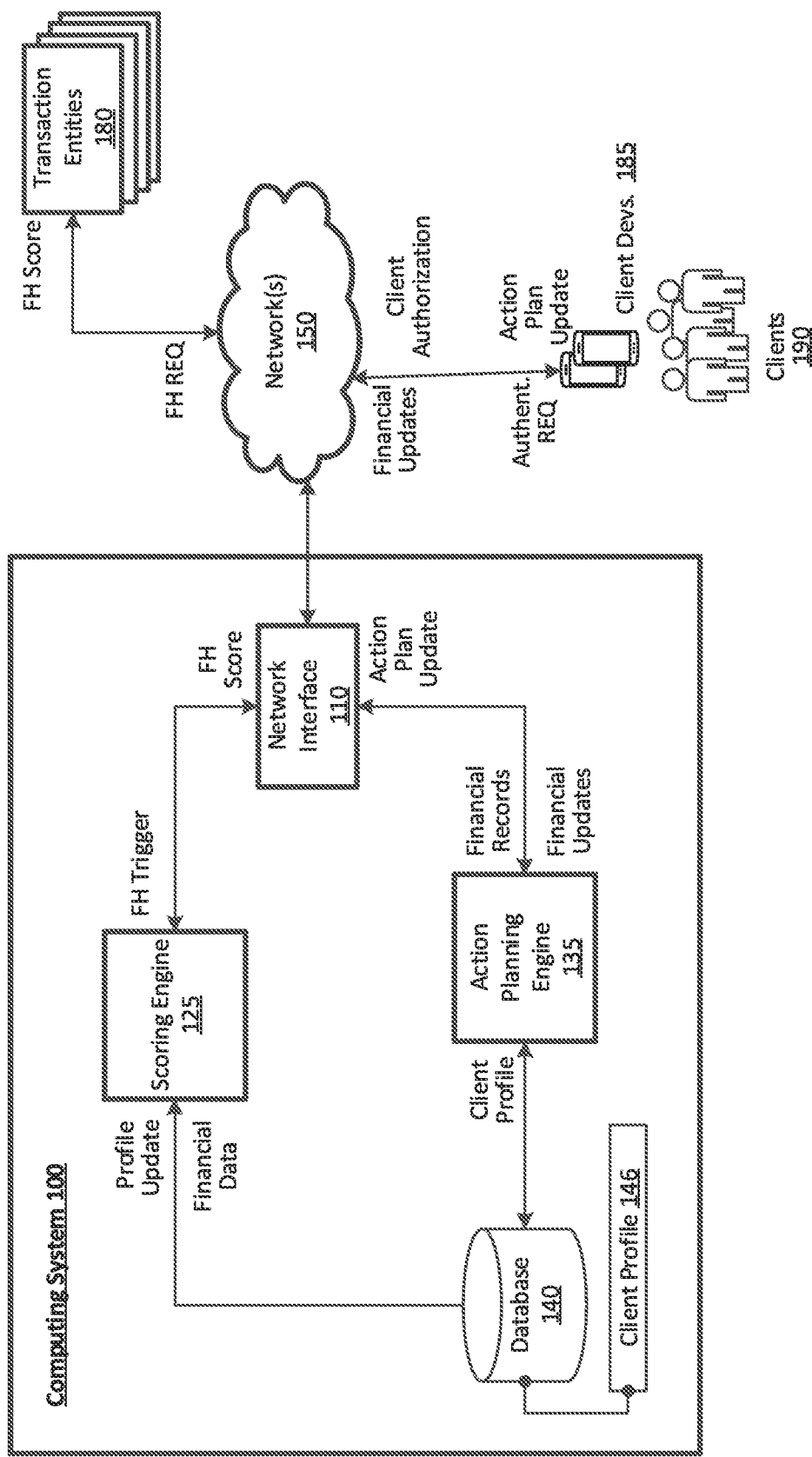
FIG. 1 is a block diagram illustrating a computing system implementing financial health scoring for direct client-merchant transactions, according to examples described herein.

According to various examples, a computing system can communicate with client devices to generate a personalized plan of action for the client to maintain or improve the client's financial situation. The computing system can initially receive a set of financial records of the client, which can include account balances, debts, and general assets and liabilities. The computing system may also receive income information for the client, such as wages, salary information, rent payments, etc. In certain aspects, the computing system can also receive information indicating the client's payments, such as monthly rent and bill payments, spending information, and the like. Based on this collective financial information of the client, the computing system can generate an optimal action plan for the client, which can place the client on a path to achieving a set of financial goals, such as paying down debt, creating an emergency fund, investing, following a budget, saving up for a down payment on a home, building credit, etc.

In certain examples, the plan of action can flag certain aspects of the client's personal situation, such as whether the client has adequate savings to weather an emergency, whether the client owns a home, whether the client has one or more liabilities with a relatively high interest rate (e.g., an auto loan), whether the user has significant unsecured credit debt, and/or whether the client could qualify for a personal loan based on a risk score for the client. In various examples, the plan of action can comprise unique set of steps based on a prioritization scheme specific to the client. As such, the system can receive client data and financial updates of the client to generate an individualized action plan for the client. In doing so, the system can link to data sources to detect changes in real-time to each client's financial situation, such as purchase information, received income, and payments. In response to each change, the computing system can update the action plan to facilitate the client in achieving milestones toward a set of overall goals.

In various examples, the computing system can create an engagement loop for the client to facilitate with continuous and/or repeated engagement with the client's personalized action plan. In one aspect, the engagement loop can provide a messaging or communication application to communicate with a human or computerized advisor, analyze current financial information, weigh each aspect of the client's assets and liabilities, and recommend a personalized and sequential set of supplementary actions based on the current situation of the client. In doing so, the computing system can factor in discrete elements of the client's balance sheet (e.g., the client's mortgage information) and direct the client to a relevant resource to aid with that discrete element or related elements (e.g., a HELOC provider to eliminate credit card debt of the client).

In further examples, the computing system can provide a financial health score to each client based on the client's personal financial situation and/or progress using the individualized action plan. The financial health score can comprise a proprietary composite of the personal information provided to the computing system. Based on the changing financial situation of the client and/or the client's progress in following the individualized action plan, the computing system can generate a continuously updated financial health score for the client. According to examples, the computing system can receive the financial data from the client's computing device dynamically and can execute the prioritization and planning models on the dynamic financial information in real time to update the personalized action plan and the financial health score for the client.

It is contemplated that the computing system can eliminate the need for currently existing credit bureaus, which generate credit reports and credit scores for individuals. Currently, these credit bureaus use the accumulated financial information of individuals to generate their credit reports and scores, which the bureaus sell to institutions (e.g., bank) that use those reports and scores to inform lending decisions. In doing so, the credit bureaus compile highly personal information of the individuals that is not owned by these individuals. Instead, the highly personal financial data that these individuals generate (e.g., via cash flow in and out of accounts, debt repayment decisions, and other factors) are inputted into computational models that are currently owned by these credit bureaus.

According to examples provided herein, the computing system can provide ownership of the clients' financial health scores to those individual clients. Specifically, the personal financial information of each client can be stored, via an executing application, on the client's computing device (e.g., in local memory). Using the application, the client's computing device can capture banking information, cash flow information (in/out of accounts), purchase history, debt repayment details, and the like. Thus, the information currently used by credit bureaus to generate credit reports and score can be controlled by the client and made accessible by the client to entities with which the client decides to engage (e.g., make purchases, take out loans, etc.). It is contemplated that this democratization of clients' own personal financial information will have the effect of removing the credit bureaus from financial contracts by facilitating direct contact between individual clients and institutions that enter into exchanges with the clients (e.g., for goods and services, financial products, loans, etc.).

Examples described herein achieve a technical effect of implementing real-time, automated financial planning and advising services for clients using dynamic financial data received through network communications with the computing device of the client and/or financial entities associated with the client. The computing system can update an individualized action plan for the client based on the dynamic data, and continuously update a financial health score, which can be utilized for direct client-merchant credit checks.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code, computer-executable instructions, algorithms, and/or computer models developed through software coding. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the disclosure include processors and various forms of memory for holding data and instructions.

Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating a computing system 100 implementing financial health scoring for direct client-merchant transactions, according to examples described herein. The computing system 100 includes a network communication interface 110 to communicate, over one or more networks 150, with client computing devices 185 of clients 190 (e.g., via an executing application on the client devices 185). In various examples, the clients 190 may interact, in person or online, with transaction entities 180, which can comprise any merchant or merchant computing system that may require a credit check or determine the financial risk of a client 190. Examples of such transaction entities 180 can include mortgage providers, banks, auto dealers, real estate sellers, consumer goods sellers, and the like.

According to examples described herein, the computing system 100 includes an action planning engine 135 that can initially provide a customized and detailed financial action plan for each client 190 based on a global view of that client's 190 current financial situation. The initial individualized action plan can be generated by the action planning engine 135 based on the financial records of the client 190, which the planning engine 135 can access or receive from the client's device 185, or any accounts from financial entities associated with the client 190. In one example, the client device 185 can execute an application that enables the computing system 100 to link with the various accounts associated with the client 190, such that the action planning engine 135 can create and store a client profile 146 for the client 190.

In various examples, the client profile 146 can comprise identifying information of the client, such as a name, address, contact information, as well as continuously updated financial information, such as current balances of the client's accounts, current assets and liabilities, monthly expenditures, and the like. For example, the financial records of the client 190 can comprise any personal property (e.g., jewelry, gold, memorabilia, vehicles, art assets, etc.), debt obligations (e.g., personal loans or debts to individuals, monthly financed service payments, mortgage payments, etc.), personal income (e.g., wages, received rents, and other income sources), rent and utility payments, monthly bills, and the like. Such information is used by the action planning engine 135 to generate the customized financial action plan for the client 190.

Specifically, the action planning engine 135 can receive the financial records, described herein, of the client 190 to generate an individualized financial action plan for the client 190 to follow when steadying, improving upon, or maintaining financial health (e.g., repaying debt, managing payments, building credit, saving, budgeting, etc.). As described below, the individualized action plan can be accessed by the client 190 via an executing financial service application provided by the computing system 100. In certain implementations, the client 190 can input a set of personal goals, such as purchasing a home or paying off debt, which the action planning engine 135 can utilize to construct the customized action plan for the client 190. Accordingly, based on the current financial records of the client 190, the action planning engine 135 can generate an optimal budget, debt payment strategy, debt refinancing strategy, In various examples, the action planning engine 135 provides a granular financial action plan for the client 190 that can be updated dynamically as financial updates of the client 190 are received. In doing so, the action planning engine 135 can execute optimization logic using the client's financial records and updates to dynamically generate a real-time individualized action plan for the client 190. As described in further detail below, the individualized action plan can facilitate the client 190 in generating an optimal budget based on the financial information of the client 190, facilitate in managing and/or paying down debt, assist the client 190 with monthly spending, improving the client's credit, aid the client in savings, and the like. Furthermore, the action planning engine 135 can update the individualized action plan based on update triggers that indicate any changes in the client's 190 finances, such as receiving wages, making purchases, making debt payments, making rental payments, and the like. For example, the action planning engine 135 can receive an update trigger indicating that the client 190 has received a paycheck. In response, the action planning engine 135 can perform a lookup of a client profile of 146 of the client 190, which can indicate a current action plan specific to the client 190.

Based on the update trigger indicating the change to the client's 190 financial situation, the action planning engine 135 can update the individualized action plan for the client 190, flag or provide a warning for any potential upcoming problems (e.g., an inability to make a payment in full, closing in on or exceeding a budget threshold, missing a savings target, etc.), and show progress updates for each of any number of financial goals. In certain aspects, the individualized action plan can indicate periodic goals (e.g., monthly goals) for savings, payments, spending or budgeting, and the like. As each goal get closer to being achieved, a progress indicator can provide the client 190 with an incentive to achieve each periodic goal detailed by the individualized action plan.

In various implementations, the action planning engine 135 can also generate overall goals for the client 190 based on the client's own personal goals, such as purchasing a home, eliminating debt, and/or building credit. Additionally or alternatively, the optimization logic executed by the action planning engine 135 can process the financial records and updates of the client 190 to determine a set of financial health prioritizations for the client 190 that may be generalized to all clients 190. For example, the prioritizations can comprise a sequence or balance of priorities for the clients 190, which can be generally composed of making necessary payments (e.g., bills, rents, mortgage payments, etc.), paying down debt (e.g., highest interest to lowest interest or highest balance to lowest balance, otherwise known as "avalanching" debt or "snowballing" debt respectively), building an emergency fund, creating a diversified investment portfolio, saving for a home down payment, saving for a child's education, and the like. Each overall milestone in the prioritizations can be directly connected to or associated with the periodic goals, such that achievements of the periodic goals have an add-on effect of contributing to the overall milestones and goals for the client 190.

In further implementations, the computing system 100 can include a scoring engine 125 that executing financial scoring logic to generate a financial health score for the client 190. The financial scoring logic can receive, as input, current financial data pertaining to the client 190 (e.g., as stored in the client's profile 146 in the database 140), the current individualized action plan of the client 190, and any recent updates in the client's 190 profile 146 that indicates recent financial changes described above. In various examples, the scoring engine 125 can be triggered each instance an update is detected in the client's 190 financial situation, and can include such granular aspects as making a goods purchase, receiving a paycheck, making a debt payment, paying off a debt account, and the like.

In certain examples, the scoring engine 125 can operate in real-time as updates are received or continuously by monitoring the client's 146 profile 146 for updates (e.g., as inputted by the action planning engine 135). Thus, when a credit trigger is received from the client 190 or a transaction entity 180 with which the client 190 engages in a transaction, the scoring engine 125 can provide a current, real-time financial health score of the client 190. This real-time financial health scoring is distinct from current implementations of credit bureaus, which only periodically update the credit score of an individual when one of a limited number of triggers—such as a late payment, a credit check, exceeding a credit spending threshold, closing a credit card, a third-party complaint being received, paying off a loan, applying for a new loan, etc. —are detected.

The scoring engine 125 can output a three-digit score, similar to credit bureaus, but one that is updated dynamically. In variations, the scoring engine 125 can output the financial health score as a percentage between one and one hundred. In further variations, the financial health score can be color coded and/or can include a shape that fills or fades in as the score improves. Regardless of the design in which the score is outputted, the scoring engine 125 can be triggered to provide the financial health score to transaction entities 180 and/or client devices 185 on-demand.

In particular, when the client 190 transacts with a financial entity 180, either via the network 150 or in person, the transaction entity 180 may require a financial health check or credit check prior to completing a transaction. Such transactions may include the purchase of a vehicle, a home, or any goods or services. Such transactions may also involve an application for a loan to purchase such goods and/or services, or an application to receive and use a credit card with a specified credit limit that is to be based on the client's 190 financial health score. Thus, similar to the credit scores provided by the credit bureaus, the financial health score provided by the scoring engine 125 can determine credit worthiness, financial risk of the client 190, credit or loan limits, and/or interest rates available to the client 190.

As an example, if the client 190 wishes to purchase a vehicle that is offered for sale by a specified transaction entity 180 (e.g., auto dealership), the transaction entity 180 may transmit a financial health request over the network 150 to the computing system 100. In various examples, the financial health request can indicate a client identifier of the client 190. Additionally or alternatively, the scoring engine 125 may require an authentication from the client 190. Thus, upon receiving the financial health trigger from the transaction entity 180, the scoring engine 125 can immediately transmit an authentication request to the computing device 185 of the client 190. In certain examples, the authentication request can comprise a single input confirmation that enables the client 190 to provide or decline a client authorization to release the current financial health score of the client 190. In still further examples, the client 190 and the transaction entity 180 may separately and near simultaneously provide the financial health request and the client authorization to the scoring engine 125, which can output the current financial score of the client 190 thereafter.

Thus, the scoring engine 125 upon receiving the financial health request and client authorization, can output the financial health score of the client 190 in real-time since the financial health score is dynamically updated and readily available. In the example provided, upon receiving the financial health score of the client 190, the transaction entity 180 can determine whether the client 190 qualifies for a loan for the vehicle, an annual percentage rate for the loan, the terms of the loan, etc.

As provided herein, the dynamically updated and individualized action plan and financial health score for each client 190 provides a technical solution to current problems that exist in the field of personal finance. It is contemplated that a number of these problems are practical in nature. However, the current lack of a dynamically updated financial action plan and individually tailored to each client 190, as well as a dynamically updated financial health score, exemplifies the technical problem currently observed in the field of financial management and credit services. Specifically, while several savings, budgeting, and investing tools are available for individuals in the field of personal financial management, the technical field current lacks a dynamically updated, virtual, and personalized financial assistance tool for clients 190 seeking to improve, manage, and/or sustain their personal financial health. Furthermore, credit bureaus, which derive their revenues from the collection and sale of private credit information of individuals, may be bypassed such that the client 190 controls his/her own proprietary financial information through the trusted service implemented by the computing system 100.

In other words, it is contemplated that the combination of (i) a dynamically updated, individualized action plan for achieving periodic and overall financial milestones and goals, and (ii) a dynamically updated financial health score provided through real-time network links with the clients' computing devices 185 and/or transaction entities 180 integrate the manual gathering of financial data, the development of financial plans, and the determination of credit scores into a practical application. The automation of financial action planning and health scoring and their dynamically updated nature have only been made possible through improvements in network communications and computing technology (e.g., smartphone and application-based technical improvements). Accordingly, the current lack of such tools in the field of personal financial advising, planning, and management itself comprises a technical problem to which the present disclosure provides a technical solution.

Client Computing Device

Figure 2:
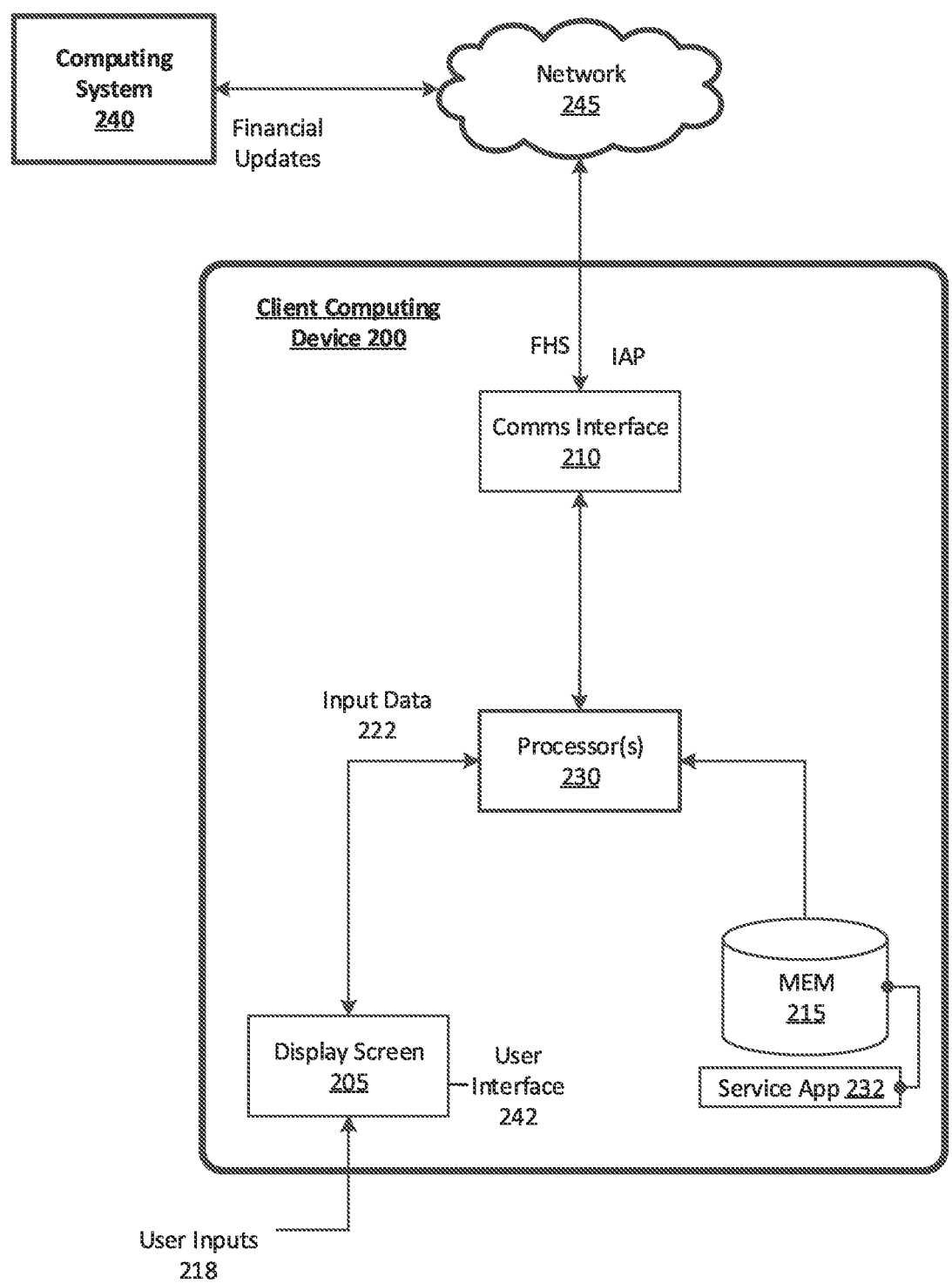
FIG. 2 is client computing device executing a direct service application, according to various examples.

FIG. 2 is client computing device 200 executing a financial service application 232, according to various examples. In many implementations, the computing device 200 can comprise a mobile computing device, such as a smartphone, tablet computer, laptop computer, VR or AR headset device, and the like. In variations, the computing device 200 can comprise a desktop personal computer typical of the office spaces of business entities, or a computer server of a backend server network. In some examples, the computing device 200 can include certain features such as a microphone, a camera, a positioning system, and a sensor system (e.g., IMU), such as those included in mobile computing devices. Additionally or alternatively, the computing device 200 can include a communication interface 210 to communicate with external entities using any type of wireless or wired communication protocol. In certain aspects, the computing device 200 can store a designated application (e.g., a financial service application 232) in a local memory 215 to enable a client to engage the service described in connection with FIG. 1.

In response to a user input 218 selecting the service application 232, the application 232 can be executed by one or more processors 230, which can cause a user interface 242 to be generated on a display screen 220 of the computing device 200. Furthermore, the executing application can enable the computing device 200 to communicate with the computing system 240 over one or more networks 245. As provided herein, the computing system 240 shown in FIG. 2 can correspond to the computing system 100 described in connection with FIG. 1.

The user interface 242 of the service application 232 can enable the client 190 to sign up for and engage with the financial service implemented by the computing system 100, 240. For example, a client 190 can launch the application 232 to generate an interactive user interface 242 on the display screen 205, which the client 190 can interact with to view a personalized balance sheet, a dynamically updated, individualized action plan, and a real-time financial health score, as described herein.

As further described herein, execution of the service application 232 can cause the computing device 200 to transmit financial updates to the computing system 240. In variations, the client 190 can input personal information (e.g., a username and password) for each linked account that is to be tracked by the computing system 240 for updating the personal balance sheet and individualized action plan for the client 190. For example, the links can provide the computing system 240 access to various accounts of the client 190 in order to receive financial updates of the client 190 in real time. Thereafter, the computing system 240 can link to the financial accounts of the client 190 directly. The individualized action plan and financial health score can be presented on the interactive user interface 242 as a customized tool for the client 190 in improving or sustaining a personal financial condition (e.g., like a virtualized personal financial assistant) and engaging in transactions.

In some aspects, the interactive user interface 242 can provide the client 190 with a gamified approach to sustaining or improving personal financial health. As such, the individualized action plan can provide milestones and overall goals with progress indicators for each milestone and goal. It is contemplated that such an approach—being performed in real-time for the client 190—provides crucial incentives and personal motivation for typical users that are currently lacking in the technical field of personal financial management. Such gamified incentives are currently provided through physical health monitoring applications that measure health aspects of users, such as blood pressure, pulse rate, activity (e.g., distance traveled, steps taken, etc.), sleep quality, etc. to provide users contextual information regarding their personal health on a day-to-day basis. These physical health applications also provide progress or milestone indicators (e.g., color-coded scores or achievement bars and rings) that have been observed to effectively improve upon certain users' current health and activity habits. It is contemplated that the gamified financial health monitoring and progress indication methods described herein can have similar beneficial effects for certain clients 190 (e.g., those struggling with debt or wishing to save more).

Example Individualized Action Plan

Figure 3:
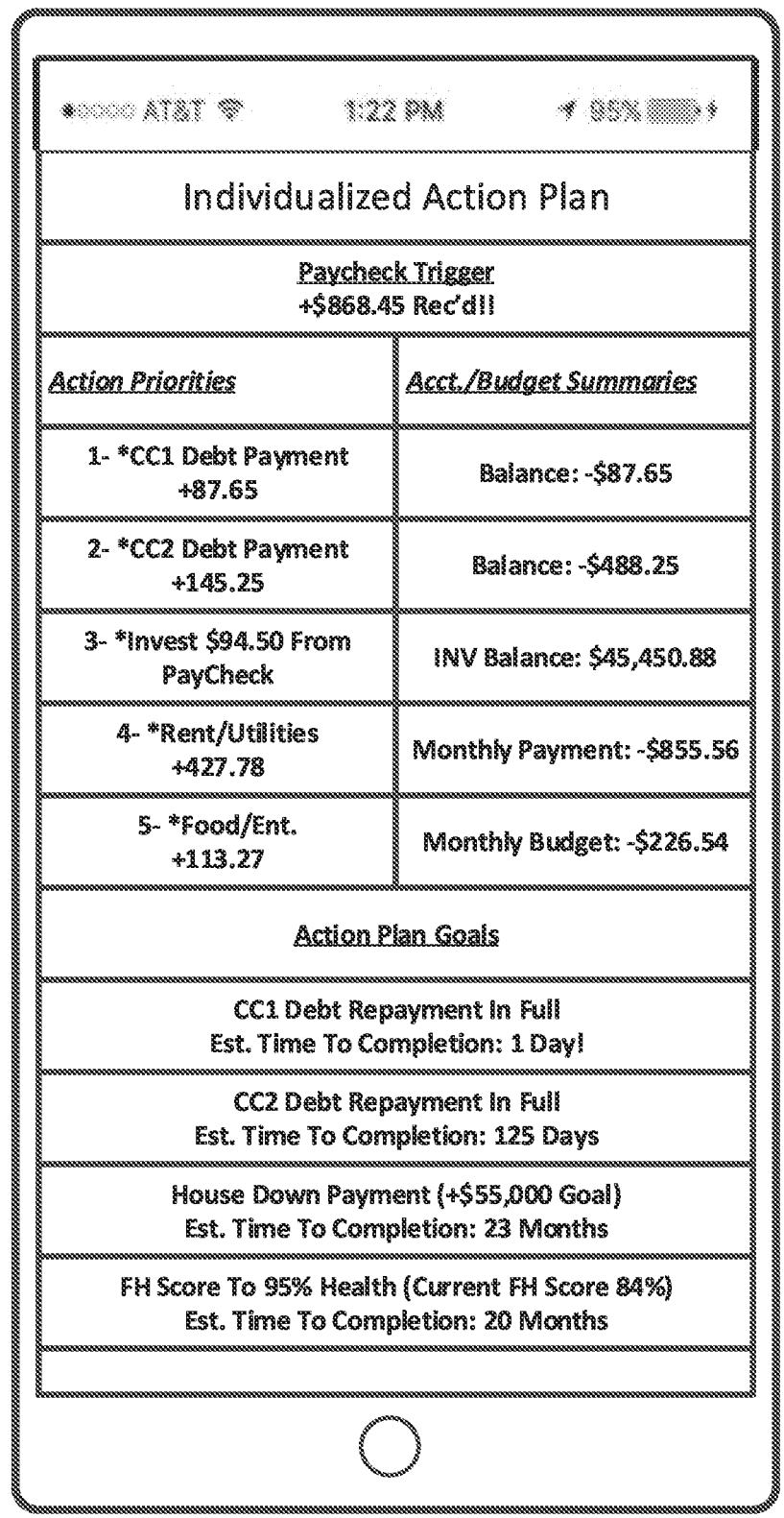
FIG. 3 is an example individualized action plan for a client of the financial health scoring service, according to various examples.

FIG. 3 shows an example of an individualized action plan 350 for a client 190, according to certain examples. In one example, the individualized action plan 350 can be for a home-owning client, and can prioritize the payment of credit card debt (e.g., through a HELOC) to refinance the credit card debt with a lower rate. In such an example, a second priority of the action plan 350 for this client 190 may be to reduce monthly bills (e.g., refinancing an auto loan, budgeting food and entertainment spending, etc.), and then create an emergency fund. A final step of the action plan 350 for this client 190 may be to improve a financial health score and/or build credit. In some aspects, for each prioritized step of the action plan 350, the computing system 100 can link the client 190 to one or more resources that further aid the client 190 with respect to that particular step.

Referring to FIG. 3, the individualized action plan 350 specific to a certain client 190 can, for example, indicate an update to the action plan 350 triggered by the client 190 receiving a paycheck. Based on the trigger, the action plan 350 can generate customized priority updates for deploying the received money. In the example shown, the action plan 350 provides the client 190 with detailed priorities specific to the received paycheck, such as paying off a credit card (first priority), paying down a second credit card (second priority), depositing a portion in a specific investment account (e.g., an ETF or index fund) (third priority), dedicating a portion of the paycheck to rent and utilities (fourth priority), and dedicating a portion to food and entertainment (fifth priority). The number of priorities can vary based on the nature of the trigger and can include various differing classes. The individualized action plan 350 can further present account and budget summaries, which can also be added to and updated as the client 190 makes further financial updates (e.g., pays bills, invests, saves, makes purchases, takes out loans, etc.).

In further examples, the individualized action plan 350 can provide notifications and progress reports in accordance with the financial updates of the client 190. In the example shown in FIG. 3, the action plan 350 indicates overall action plan goals and a timeline in which those goals are to be completed if the client 190 is diligent in following the individualized action plan 350. As described herein, the client 190 can set personal goals, such as a home purchase at a particular price that requires a certain down payment. The computing system 100 can process such information through the execution of the optimization logic to generate this particular aspect of the individualized action plan 350. In the example shown in FIG. 3, the system 100 has determined that the client 190 should save a particular amount for a down payment to purchase a home, and an indication of how much time is required to achieve this particular milestone.

Furthermore, the computing system 100 may further determine, as a background operation, that the client 190 will require a financial health score of 95% to access the lowest mortgage rates when the time comes to purchase a home. Accordingly, the action plan 350 generated by the computing system 100 can also generate a financial health score milestone (e.g., as determined by the scoring engine 125 of FIG. 1) to be achieved by a certain time prior to completion of the house down payment savings milestone, as shown in FIG. 3. In addition, the individualized action plan 350 can provide the client 190 with low level actions, such as the paycheck triggered actions shown in FIG. 3, that when performed by the client 195 and combined over time, can promote the completion of overall action goals (e.g., achieving a particular financial health score by a certain date).

Additional features of the individualized action plan 350 are also contemplated. For example, if the client 190 owns a home and is struggling to pay down high interest debt (e.g., credit card debt), the optimization logic executed by the action planning engine 135 described in FIG. 1 can determine an optimal manner in which to refinance the high-interest debt, such as taking out a HELOC at a significantly lower interest rate to pay off the credit card debt balance outright. Upon determining such optimal actions for the client 190, the interactive user interface 242 displaying the individualized action plan 350 can further provide selectable links to third-party or internal services (e.g., causing a corresponding application on the client's computing device 185 to be launched) that enable the client 190 to readily undertake the process of completing the optimal action. In the example of a HELOC, the individualized action plan 350 can provide a selectable icon that, when selected, links the client 190 to one or multiple HELOC providers, showing offered rates based on the client's 190 current financial situation, which can be provided to the HELOC provider(s) automatically by the computing system 100.

Methodology

Figure 4A:
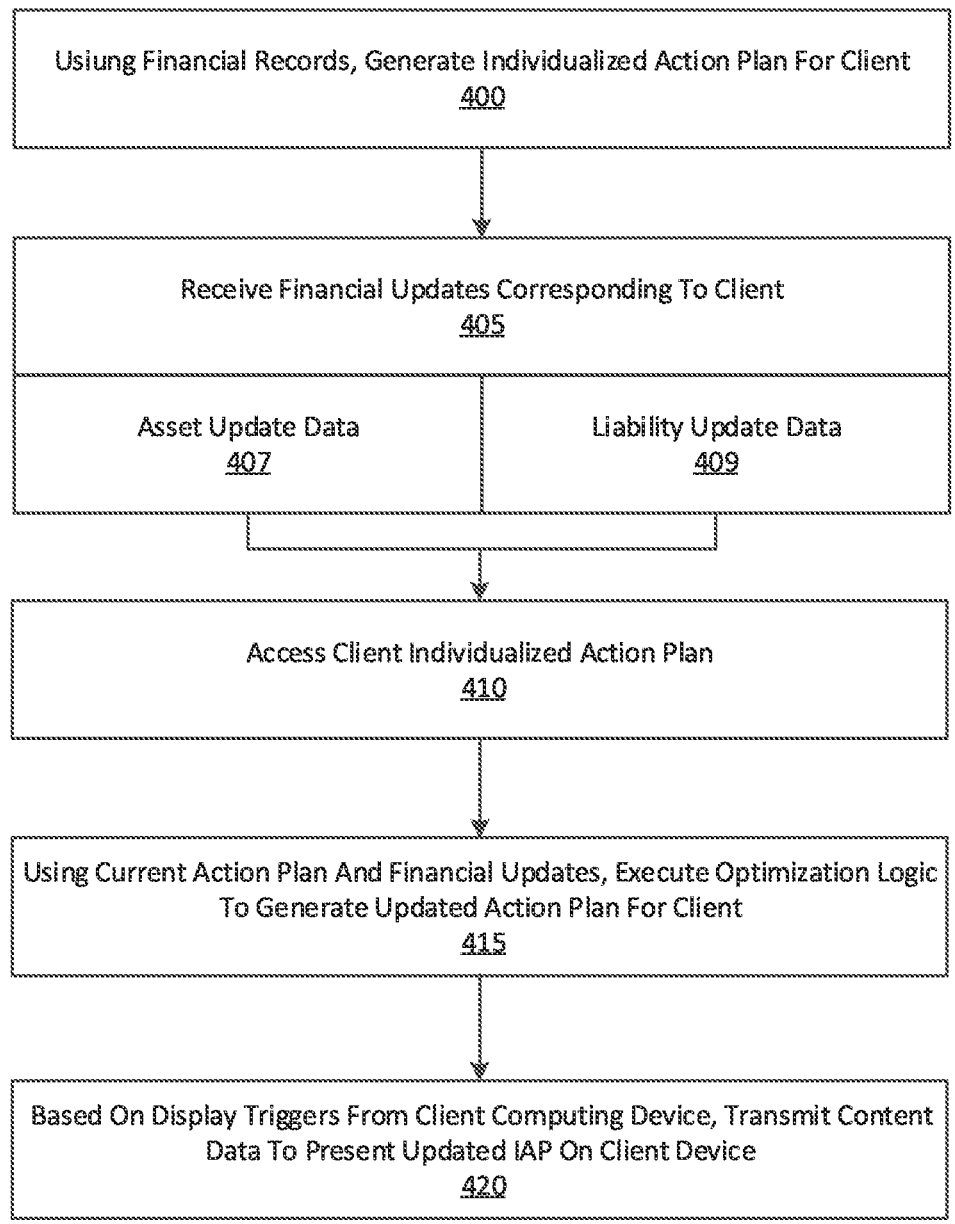
FIGS. 4A and 4B are flow charts describing example methods of generating a custom action plan for a client and facilitating direct client-merchant credit reporting, according to examples described herein.
Figure 4B:
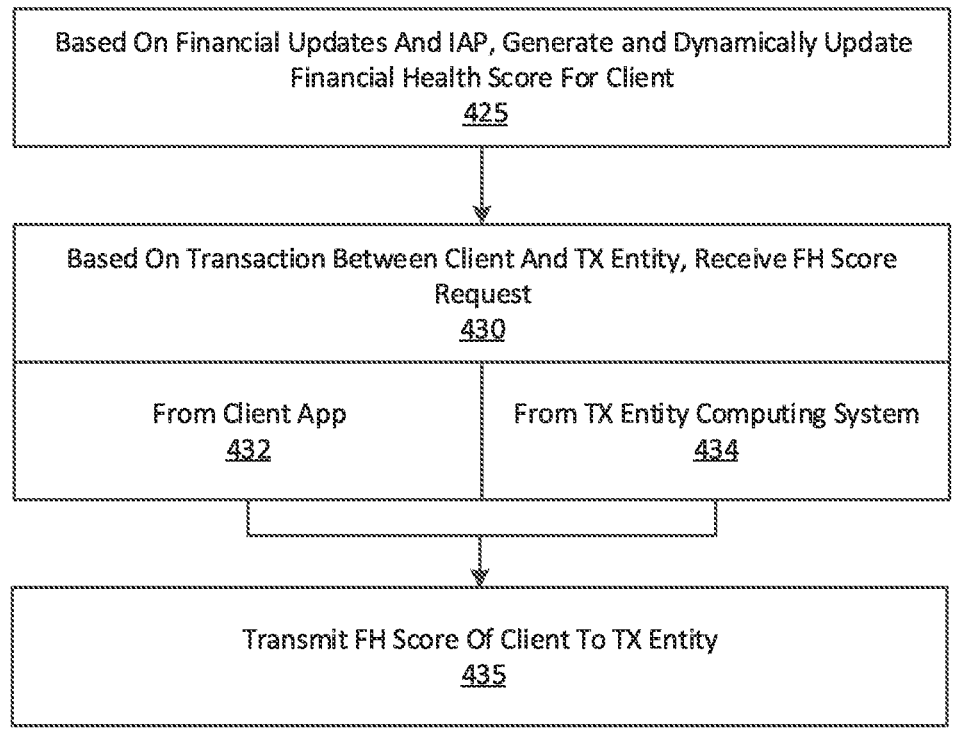

FIGS. 4A and 4B are flow charts describing example methods of generating a custom action plan for a client and facilitating direct client-merchant credit reporting, according to various examples. In the below description of FIGS. 4A and 4B, reference may be made to reference characters representing like features as shown and described with respect to FIGS. 1 through 3. Furthermore, the processes described in connection with FIGS. 4A and 4B may be performed by an example computing system 100, 240 as shown and described with respect to FIGS. 1 and 2. Referring to FIG. 4A, the computing system 100 can generate an individualized action plan 350 for a client 190 based on the client's 190 current financial records (400). The computing system 100 may then receive financial updates corresponding to the client 190 (405), such as asset update data indicating purchase and acquisition information and income information (407), and liability update data, such as debt, bill, and rent payment information, and new loan information (409).

In various aspects, the computing system 100 access the individualized access plan 350 of the client (410), and using the current action plan and financial updates, the computing system 100 can execute optimization logic to generate an updated action plan 350 for the client 190 (415). Thereafter, the computing system 100 can receive update triggers from the client's 190 computing device 185 and in response, transmit content data to present the updated individualized action plan 350 on the client device 185 (420), as described herein.

FIG. 4B is a flow chart describing an example method of dynamically updating a financial health score of a client 190. In various examples, the computing system 100 can generate and dynamically update a financial health score for a client 190 based on financial updates and a current individualized action plan 350 (425). Based on a transaction between the client 190 and a transaction entity 180, the computing system 100 can receive a financial score request (430). In one example, the request can be received from the service application 232 executing on the client's 190 computing device 185. In variations, the request can be received from the computing system of the transaction entity 180 (434).

In further variations, the transaction request can be received from the transaction entity 180 and may require client authorization prior to releasing. Thus, the computing system 100 may prompt a rapid authentication process in which the request is receive, a single-input authentication request is transmitted to the client device 185, and a confirmation is received from the client 190. Upon receiving the request and/or confirmation from the client 190, the computing system 100 can transmit the financial health score of the client 190 to the transaction entity 180 (435).

Hardware Diagram

Figure 5:
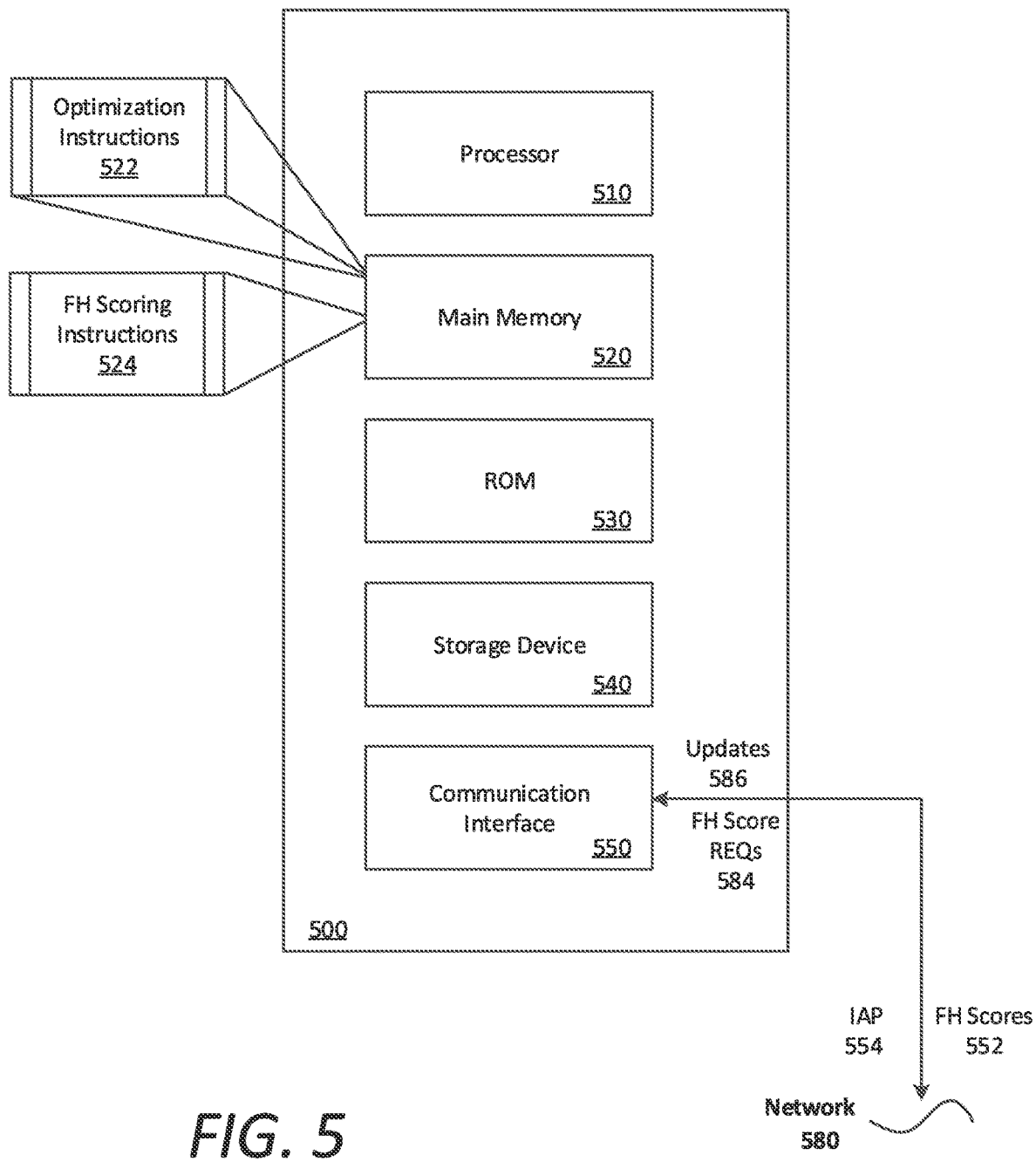
FIG. 5 is a hardware diagram illustrating a computer system upon which examples described herein may be implemented.

FIG. 5 is a hardware diagram illustrating a computer system upon which examples described herein may be implemented. A computer system 500 can be implemented on, for example, a server or combination of servers. For example, the computer system 500 may be implemented as part of a network service for providing transaction services. In the context of FIGS. 1-2, the transaction computing system 100, 240 may be implemented using one or more computer systems 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular or Wi-Fi network) through use of the network link (wireless or wired). Using the network link, the computer system 500 can communicate with one or more computing devices, one or more servers, and/or client transaction terminals. The executable instructions in the memory 520 can include optimization instructions 522, which the computer system 500 can execute to generate and update an individualized action plan 554 for a client 190, as described herein. In doing so, the computing system 500 can receive financial updates 586 of the client 190 dynamically and update the action plan 554 accordingly.

The executable instructions stored in memory 520 can also include financial health scoring instructions 524, which the computer system 500 can execute to generate and dynamically update a financial health score 552 for a client 190, as further provided herein. Furthermore, execution of the scoring instructions 524 can cause the computer system 500 to receive financial health score requests 584, perform the authentication techniques described herein, and transmit the financial health scores 552 accordingly.

The processor 510 is configured with software and/or other logic to perform one or more processes, steps and other functions described with implementations, such as described with respect to FIGS. 1-4B, and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A computing system comprising:
   a network communication interface communicating, over one or more networks, with computing devices of clients of a financial health service;
   one or more processors; and
   a memory storing instructions that cause the computing system to:
      receive, over the one or more networks, client financial data of a client of the financial health service, wherein the client financial data includes data received from an account that the client has linked to the financial health service;
      using the client financial data, generate an individualized action plan and a financial health score for the client;
      receive, in real time over the one or more networks, financial update data indicating changes to a financial situation of the client, wherein the financial update data is updated in part in each instance where a corresponding transaction involving the corresponding account that the client has linked to the financial health service is detected;

in response to receiving the financial update data, update the individualized action plan and the financial health score for the client;

receive, over the one or more networks, a financial health request from a computing device of a transaction entity with which the client transacts;

in response to receiving the financial health request from the computing device of the transaction entity, transmit, over the one or more networks, an authentication request to the computing device of the client, wherein the authentication request is generated in an application on the computing device of the client;

receive, over the one or more networks, via a user interface of the application on the computing device of the client, the client's input authorizing the computing system to release the updated financial health score of the client to the computing device of the transaction entity;

and based on the client's input authorizing the release of the updated financial health score, transmit, over the one or more networks, the updated financial health score to the computing device of the transaction entity.

2. The computing system of claim 1, wherein the client financial data indicates assets and liabilities of the client, the assets and liabilities indicating asset account balances and debt balances of the client.

3. The computing system of claim 2, wherein the client financial data further indicates an income of the client.

4. The computing system of claim 1, wherein the changes to the financial situation of the client include received income, one or more purchases, or one or more payments made by the client.

5. The computing system of claim 4, wherein the executed instructions cause the computing system to execute optimization logic using the financial update data of the client to dynamically update the individualized action plan and the financial health score as the changes to the financial situation of the client are detected.

6. The computing system of claim 1, wherein the individualized action plan for the client indicates a set of prioritizations to be performed by the client in order to achieve a set of milestones that correspond to a set of action plan goals.

7. A non-transitory computer readable medium storing instructions that, when executed by one or more processors of a computing system, cause the computing system to:
communicate, over one or more networks, with computing devices of clients of a financial health service;
receive, over the one or more networks, client financial data of a client of the financial health service, wherein the client financial data includes data received from an account that the client has linked to the financial health service;
using the client financial data, generate an individualized action plan and a financial health score for the client;
receive, in real time over the one or more networks, financial update data indicating changes to a financial situation of the client, wherein the financial update data is updated in part in each instance where a corresponding transaction involving the corresponding account that the client has linked to the financial health service is detected;
in response to receiving the financial update data, update the individualized action plan and the financial health score for the client;

receive, over the one or more networks, a financial health request from a computing device of a transaction entity with which the client transacts;

in response to receiving the financial health request from the computing device of the transaction entity, transmit, over the one or more networks, an authentication request to the computing device of the client, wherein the authentication request is generated in an application on the computing device of the client;

receive, over the one or more networks, via a user interface of the application on the computing device of the client, the client's input authorizing the computing system to release the updated financial health score of the client to the computing device of the transaction entity;

and based on the client's input authorizing the release of the updated financial health score, transmit, over the one or more networks, the updated financial health score to the computing device of the transaction entity.

8. The non-transitory computer readable medium of claim 7, wherein the client financial data indicates assets and liabilities of the client, the assets and liabilities indicating asset account balances and debt balances of the client.

9. The non-transitory computer readable medium of claim 8, wherein the client financial data further indicates an income of the client.

10. The non-transitory computer readable medium of claim 7, wherein the changes to the financial situation of the client include received income, one or more purchases, or one or more payments made by the client.

11. The non-transitory computer readable medium of claim 10, wherein the executed instructions cause the computing system to execute optimization logic using the financial update data of the client to dynamically update the individualized action plan and the financial health score as the changes to the financial situation of the client are detected.

12. The non-transitory computer readable medium of claim 7, wherein the individualized action plan for the client indicates a set of prioritizations to be performed by the client in order to achieve a set of milestones that correspond to a set of action plan goals.

13. A computer implemented method of facilitating direct client to merchant transactions, the method being performed by one or more processors and comprising:
communicating, over one or more networks, with computing devices of clients of a financial health service;
receiving, over the one or more networks, client financial data of a client of the financial health service, wherein the client financial data includes data received from an account that the client has linked to the financial health service;
using the client financial data, generating an individualized action plan and a financial health score for the client;
receiving, in real time over the one or more networks, financial update data indicating changes to a financial situation of the client, wherein the financial update data is updated in part in each instance where a corresponding transaction involving the corresponding account that the client has linked to the financial health service is detected;
in response to receiving the financial update data, updating the individualized action plan and the financial health score for the client;

receiving, over the one or more networks, a financial health request from a computing device of a transaction entity with which the client transacts;

in response to receiving the financial health request from the computing device of the transaction entity, transmit, over the one or more networks, an authentication request to the computing device of the client, wherein the authentication request is generated in an application on the computing device of the client;

receive, over the one or more networks, via a user interface of the application on the computing device of the client, the client's input authorizing a computing system to release the updated financial health score of the client to the computing device of the transaction entity; and based on the client's input authorizing the release of the updated financial health score, transmitting, over the one or more networks, the updated financial health score to the computing device of the transaction entity.

14. The method of claim 13, wherein the client financial data indicates assets and liabilities of the client, the assets and liabilities indicating asset account balances and debt balances of the client.

15. The method of claim 14, wherein the client financial data further indicates an income of the client.

16. The method of claim 13, wherein the changes to the financial situation of the client include received income, one or more purchases, or one or more payments made by the client.

17. The method of claim 16, wherein the one or more processors execute optimization logic using the financial update data of the client to dynamically update the individualized action plan and financial health score as the changes to the financial situation of the client are detected.

* * * * *